United States Patent [19]
Fujii et al.

[11] Patent Number: 5,936,915
[45] Date of Patent: Aug. 10, 1999

[54] MAGNETO-OPTICAL MEDIUM FOR REPRODUCING INFORMATION BY THE UTILIZATION OF MAGNETIC WALL MOVEMENT, AND SIGNAL REPRODUCING METHOD

[75] Inventors: Eiichi Fujii, Kamakura; Tsutomu Shiratori, Tokyo, both of Japan

[73] Assignee: Canon Kabushiki Kaisha, Tokyo, Japan

[21] Appl. No.: 08/931,361

[22] Filed: Sep. 16, 1997

[30] Foreign Application Priority Data

Sep. 19, 1996 [JP] Japan .................................. 8-248006
Sep. 12, 1997 [JP] Japan .................................. 9-248785

[51] Int. Cl.$^6$ .................................................. G11B 11/00
[52] U.S. Cl. ..................................... 369/13; 428/694 MM
[58] Field of Search ................................ 369/13, 14, 110; 360/59, 114; 365/122; 428/694 ML, 694 MM

[56] References Cited

U.S. PATENT DOCUMENTS

| | | |
|---|---|---|
| 4,937,799 | 6/1990 | Hashimoto et al. ...................... 369/13 |
| 5,132,945 | 7/1992 | Osato et al. .............................. 369/13 |
| 5,353,266 | 10/1994 | Fujii ........................................ 369/13 |
| 5,418,076 | 5/1995 | Shiratori ........................... 428/694 EC |
| 5,587,974 | 12/1996 | Nishimura ................................ 369/13 |
| 5,629,909 | 5/1997 | Shiratori .................................. 369/13 |
| 5,636,187 | 6/1997 | Fujii ........................................ 369/13 |
| 5,648,134 | 7/1997 | Shiratori et al. ......................... 428/641 |
| 5,656,384 | 8/1997 | Nishimura et al. ............. 428/694 ML |
| 5,719,829 | 2/1998 | Nishimura ................................ 369/13 |

FOREIGN PATENT DOCUMENTS

| | | |
|---|---|---|
| 618572A2 | 10/1994 | European Pat. Off. . |
| 673026A2 | 9/1995 | European Pat. Off. . |
| 686970A2 | 12/1995 | European Pat. Off. . |
| 785545A2 | 7/1997 | European Pat. Off. . |
| 3-93058 | 4/1991 | Japan . |

OTHER PUBLICATIONS

Peng, et al., "Modeling Magneto–Optical Domain for Mark Edge Recording", J. Magnetism and Magnetic Materials, vol. 162 (1996) pp. 369–376.

Nishimura, et al., "Magnetostatic Coupling MSR with In–Plane Magnetization Films", Jpn. J. Appl. Phys., vol. 35, (1996), pp. 403–409.

Jeng, et al., "Method of Magnetic Domain Modeling on a Moving Magneto–Optical Disk", J. Appl Phys., vol. 76, No. 10, (1994), pp. 5839–5842.

*Primary Examiner*—Tan Dinh
*Attorney, Agent, or Firm*—Fitzpatrick, Cella, Harper & Scinto

[57] ABSTRACT

A magneto-optical recording medium includes a first magnetic layer of which the magnetic wall moves and which contributes to reproduction, a third magnetic layer in which information is accumulated, and a second magnetic layer disposed between the first and third magnetic layers and having a lower Curie temperature than those of the first and third magnetic layers. The following is satisfied at the lowest temperature Ts whereat the exchange-coupling between the first and third magnetic layers is cut:

$$|k1*d\sigma w1/dT|>2*Ms1*Hw1>|k2*d\sigma w1/dT|$$

$$|k1*d\sigma w3/dT|<2*Ms3*Hw3$$

wherein T denotes temperature as represented by cgs unit system; σw1, Ms1 and Hw1 denote the magnetic wall energy density, saturation magnetization and magnetic wall coercivity, respectively, of the first magnetic layer as represented by cgs unit system; σrw3, Ms3, Hw3 denote the magnetic wall energy density, saturation magnetization and magnetic wall coercivity, respectively, of the third magnetic layer as represented by cgs unit system; and k1 and k2 denote, respectively, one and the other temperature gradient of the temperature profile formed on the medium.

5 Claims, 10 Drawing Sheets

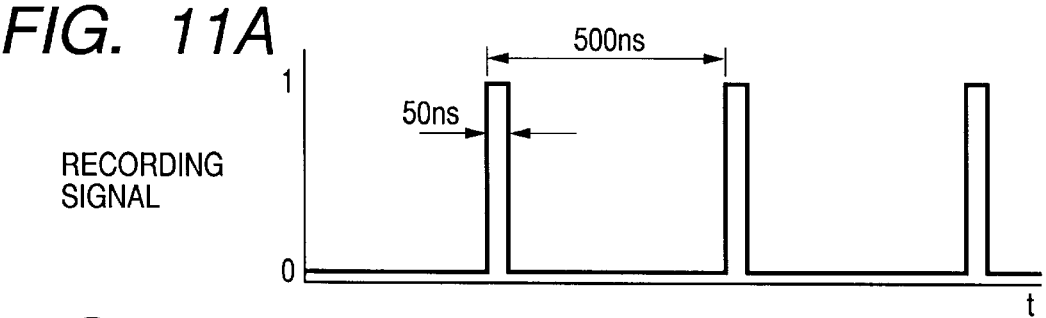
FIG. 11A RECORDING SIGNAL
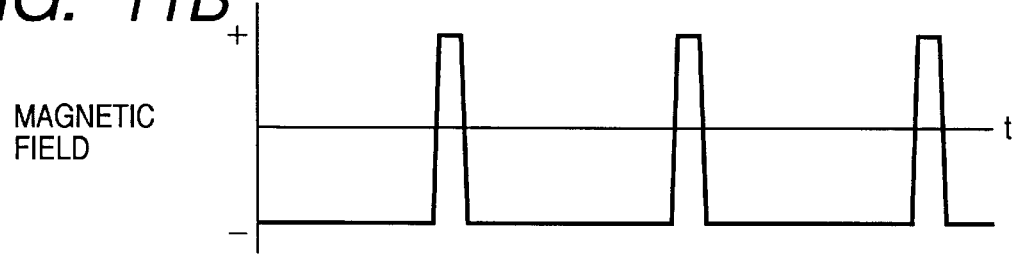
FIG. 11B MAGNETIC FIELD
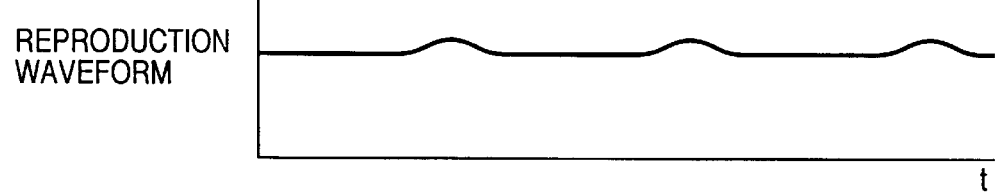
FIG. 11C REPRODUCTION WAVEFORM
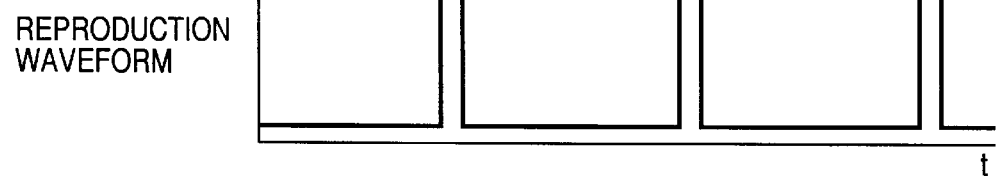
FIG. 11D REPRODUCTION WAVEFORM
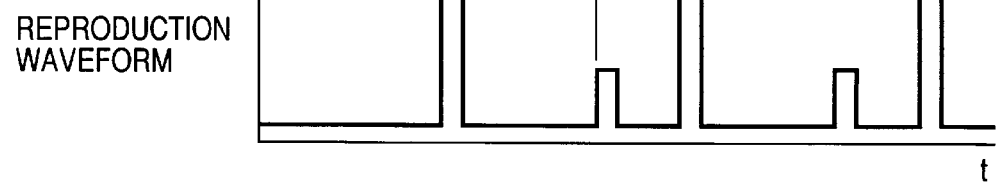
FIG. 11E REPRODUCTION WAVEFORM

MAGNETO-OPTICAL MEDIUM FOR REPRODUCING INFORMATION BY THE UTILIZATION OF MAGNETIC WALL MOVEMENT, AND SIGNAL REPRODUCING METHOD

BACKGROUND OF THE INVENTION

Field of the Invention

This invention relates to a magneto-optical recording medium and a signal reproducing method for effecting the reproduction of recorded information by a laser beam by the utilization of the magneto-optical effect, and more particularly to a magneto-optical recording medium and a signal reproducing method which make high density recording on the medium possible.

RELATED BACKGROUND ART

Attention has been paid to a magneto-optical recording medium capable of writing magnetic domains into magnetic thin film by the use of the heat energy of a semiconductor laser to thereby record information, and reading out this information by the utilization of the magneto-optical effect thereof, as a high density recording system capable of rewriting. Also, in recent years, the demand for a recording medium of large capacity in which the recording density of such magneto-optical recording medium has been further enhanced has been increasing.

The line recording density of an optical disc such as a magneto-optical recording medium depends greatly on the laser wavelength of a reproducing optical system and the numerical aperture of an objective lens. That is, when the laser wavelength $\lambda$ of the reproducing optical system and the numerical aperture NA of the objective lens are determined, the diameter of the beam waist is determined and therefore, as regards the spatial frequency during signal reproduction, the order of $2NA/\lambda$ becomes the detectable limit. Accordingly, to realize high density in a conventional optical disc, it is necessary to shorten the laser wavelength of the reproducing optical system or make the numerical aperture NA of the objective lens great.

However, there is a limit to the improvement in the laser wavelength and the numerical aperture of the objective lens. Therefore, the techniques of contriving the construction of the recording medium and a reading method to thereby improve recording density have been developed.

For example, Japanese Laid-Open Patent Application No. 3-93058 proposes a signal reproducing method of effecting signal recording on the recording holding layer of multi-layer film comprising a reproducing layer and a recording holding layer magnetically coupled together, aligning the direction of magnetization of the reproducing layer, thereafter applying a laser beam to thereby heat the reproducing layer, and reading a signal recorded on the recording holding layer while transferring the signal to the temperature-rising area of the reproducing layer. According to this method, relative to the spot diameter of a laser beam for reproduction, an area which is heated by this laser beam and reaches a transfer temperature and in which the signal is detected can be limited to a smaller area and, therefore, the intersymbol interference during reproduction can be decreased and a signal of a period below the diffraction limit of light becomes reproducible.

However, the magneto-optical reproducing method described in the above-mentioned Japanese Laid-Open Patent Application No. 3-93058 suffers from the disadvantage that the signal detection area effectively used becomes small relative to the spot diameter of the laser beam for reproduction and, therefore the amplitude of a reproduction signal is greatly reduced and a sufficient reproduction output is not obtained. Also, the magnetization of the reproducing layer must be aligned to one direction before the laser beam is applied, and a magnet for initializing the reproducing layer must be added to a conventional apparatus. Therefore, this magneto-optical reproducing method suffers from the problem that the magneto-optical recording apparatus becomes complicated and is difficult to make compact, and and the costs thereof becomes high.

SUMMARY OF THE INVENTION

So, it is the object of the present invention to solve the above-noted problems peculiar to the prior art and to provide a signal reproducing method that enables a signal of a period equal to or less than the diffraction limit of light to be reproduced at a high speed, enables a reproduction signal to be obtained with substantially the same amplitude as for a large recording magnetic domain even for a micro recording magnetic domain, can greatly improve recording density and transfer speed, and can make a reproducing apparatus low in cost and compact and a magneto-optical recording medium used in this method.

The above object is achieved by a magneto-optical recording medium provided with:

a first magnetic layer of which the magnetic wall moves and which contributes to reproduction;

a third magnetic layer in which information is accumulated; and a second magnetic layer disposed between said first magnetic layer and said third magnetic layer and having a lower Curie temperature than those of said first and third magnetic layers;

wherein the following is satisfied at the lowest temperature Ts whereat the exchange-coupling between said first magnetic layer and said third magnetic layer is cut:

$$|k1 * d\sigma w3/dT| < 2 * Ms3 * Hw3$$

σw1 . . . magnetic wall energy density of the first magnetic layer represented by cgs unit system Ms1 . . . saturation magnetization of the first magnetic layer represented by cgs unit system Hw1 . . . magnetic wall coercivity of the first magnetic layer represented by cgs unit system σw3 . . . magnetic wall energy density of the third magnetic layer represented by cgs unit system Ms3 . . . saturation magnetization of the third magnetic layer represented by cgs unit system Hw3 . . . magnetic wall coercivity of the third magnetic layer represented by cgs unit system k1 . . . one temperature gradient of a temperature profile formed on the medium k2 . . . the other temperature gradient of the temperature profile formed on the medium.

Also, the above object is achieved by a signal reproducing method of effecting the reproduction of information while applying a light beam spot to a magneto-optical recording medium provided with:

a first magnetic layer of which the magnetic wall moves and which contributes to reproduction;

a third magnetic layer in which information is accumulated; and a second magnetic layer disposed between said first magnetic layer and said third magnetic layer and having a lower Curie temperature than said first magnetic layer and said third magnetic layer, wherein the following is satisfied at the lowest temperature Ts whereat the exchange-coupling between said first magnetic layer and said third magnetic layer is cut:

$$|k1*d\sigma w3/dT|<2*Ms3*Hw3$$

σw1 . . . magnetic wall energy density of the first magnetic layer represented by cgs unit system Ms1 . . . saturation magnetization of the first magnetic layer represented by cgs unit system Hw1 . . . magnetic wall coercivity of the first magnetic layer represented by cgs unit system σw3 . . . magnetic wall energy density of the third magnetic layer represented by cgs unit system Ms3 . . . saturation magnetization of the third magnetic layer represented by cgs unit system Hw3 . . . magnetic wall coercivity of the third magnetic layer represented by cgs unit system k1 . . . temperature gradient in a temperature profile formed on the medium, on the forward side in the direction of movement of a light beam spot k2 . . . temperature gradient in the temperature profile formed on the medium, on the rearward side in the direction of movement of the light beam spot, said method being provided with the steps of:

moving said light beam spot and the medium relative to each other;

forming on said medium a temperature profile causing a portion of said second magnetic layer to rise in temperature to above Curie temperature, by said light beam spot;

making the magnetic wall in said first magnetic layer movable in the area of said temperature gradient k1, and making the magnetic wall in said first magnetic layer immovable in the area of said temperature gradient k2; and reproducing said information by detecting the movement of said magnetic wall.

The invention will hereinafter be described in detail with respect to some embodiments thereof.

BRIEF DESCRIPTION OF THE DRAWINGS

FIG. 1A shows the cross-section of a medium in a reproducing state, and schematically showing the oriented state of atomic spin; FIG. 1B is a graph showing the temperature profile of the medium, and FIG. 1C is a graph showing the profile of the magnetic wall energy density of the medium and the profile of a force acting on the magnetic wall.

FIG. 11A shows a recording signal in the magneto-optical reproducing method; FIG. 11B shows a recording magnetic field; and FIGS. 11C, 11D and 11E show reproduction signals.

DESCRIPTION OF THE PREFERRED EMBODIMENTS

Figure 1A:
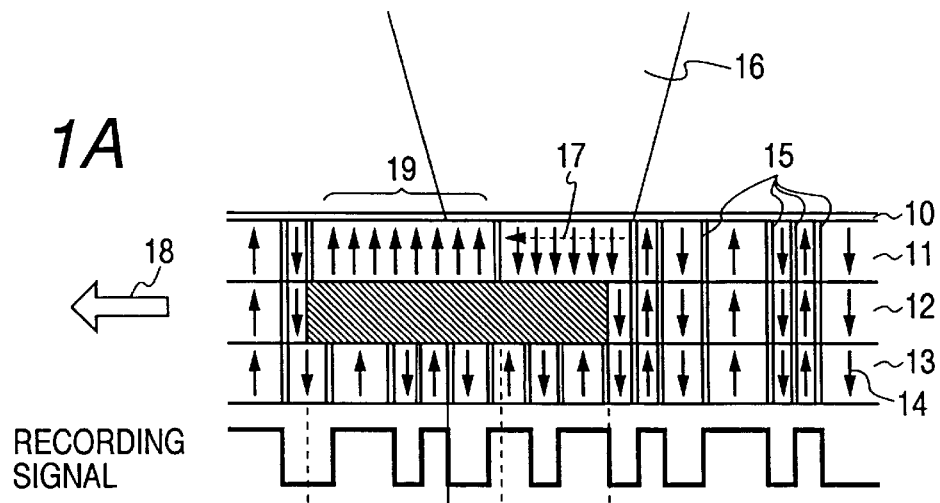
FIGS. 1A, 1B and 1C are schematic illustrations of the concept of reproduction of the magneto-optical reproducing method of the present invention.
Figure 1B:
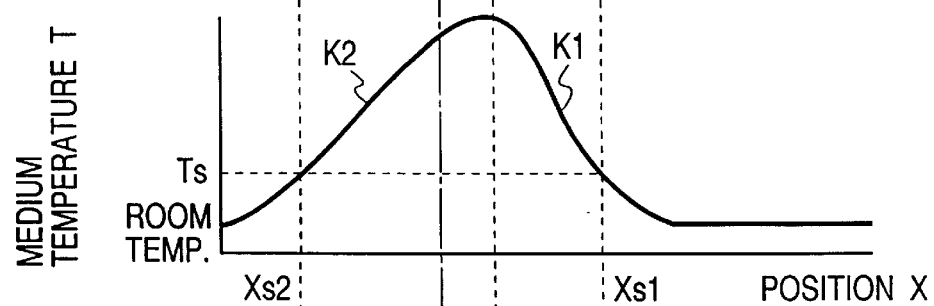
Figure 1C:
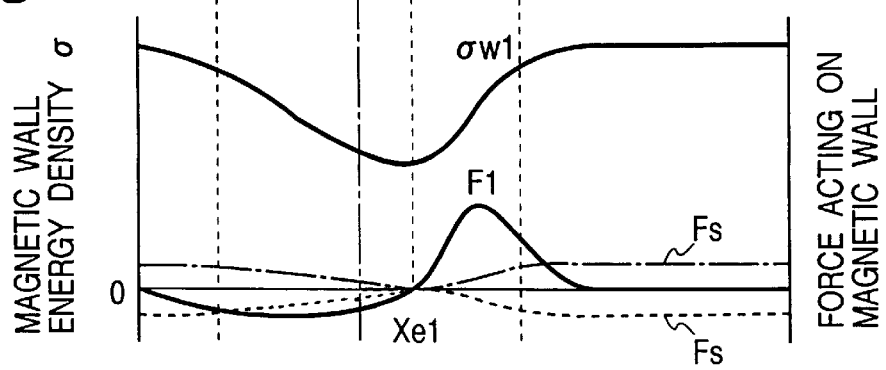

The signal reproducing method of the present invention and the action in a magneto-optical recording medium used in this method will hereinafter be described. FIGS. 1A, 1B and 1C show schematic illustrations of the concept of reproduction of the magneto-optical reproducing method of the present invention.

FIG. 1A is a schematic cross-sectional view of the magneto-optical recording medium of the present invention. The magnetic layer of this medium comprises a first magnetic layer 11 which contributes to reproduction and of which the magnetic wall moves, a second magnetic layer 12 which is lower in Curie temperature than the other layers, and a third magnetic layer 13 in which information is accumulated, the three magnetic layers being laminated in succession on a light transmitting substrate 10. The arrow 14 in each layer indicates the direction of atomic spin. Magnetic walls 15 are formed in the boundary portions of areas in which the directions of spin are opposite to each other. Also, the recording signal of this recording layer is represented as a graph in the lower portion of FIG. 1A.

FIG. 1B is a graph showing a temperature profile created in the magneto-optical recording medium of the present invention. This temperature profile is induced on the medium by a light beam itself applied for reproduction. Another heating means may be used together in order to form such a temperature profile that the temperature steeply rises on the forward side in the direction of movement of the light beam spot for reproduction, and the temperature gently lowers rearwardly of the spot. Here, at positions Xs1 and Xs2, the temperature of the medium is a temperature Ts in the vicinity of the Curie temperature of the second magnetic layer.

FIG. 1C is a graph showing the profile of the magnetic wall energy density σw1 of the first magnetic layer corresponding to the temperature profile of FIG. 1B. When as shown, there is the gradient of the magnetic wall energy density σw1 in X direction, a force F1 found from the following equation acts on the magnetic wall of each layer present at a position x.

$$F1 = \partial \sigma w1 / \partial x$$

This force F1 acts to try to move the magnetic wall toward a portion in which the magnetic wall energy is low. On the other hand, a force Fs which prevents the magnetic wall from moving also acts on the magnetic wall. The force Fs is given by the following equation:

$$Fs = 2 \times Ms1 \times Hw1,$$

where Ms1 is the saturation magnetization of the first magnetic layer, and Hw1 is the magnetic wall coercivity of the first magnetic layer. In FIG. 1C, there is also shown Fs acting on the first magnetic layer corresponding to the temperature profile of FIG. 1B. The line of upper Fs indicates a limit which can stop the magnetic wall against the force with which the magnetic wall tries to move to the left side as viewed in the figure, and the line of lower Fs indicates a limit which can stop the magnetic wall against the force with which the magnetic wall tries to move to the right side as viewed in the figure.

When F1 is greater than Fs, that is, when $$|F1| > |Fs|$$

is satisfied, the first magnetic layer singly has its magnetic wall easily moved by this force F1. However, in the area on the forward side (the right side as viewed in FIG. 1A) of the position Xs1, the temperature of the medium is still lower than Ts and the first magnetic layer is exchange-coupled with the third magnetic layer which is great in magnetic wall coercivity; therefore, the magnetic wall in the first magnetic layer is also fixed at a position corresponding to the location of the magnetic wall in the third magnetic layer. In the present invention, as shown in FIG. 1A, the magnetic walls 15 are at the position Xs1 of the medium, and when the temperature of the medium rises to the temperature Ts in the vicinity of the Curie temperature of the second magnetic layer and the exchange-coupling between the first magnetic layer and the third magnetic layer is cut, the magnetic walls 15 in the first magnetic layer move in a direction indicated by broken-line arrow 17 toward an area Xe1 in which the temperature is higher and the magnetic wall energy density is small at a high speed (higher than the relative speed of the light spot and the medium).

On the other hand, in the rear (the left side as viewed in FIG. 1A) in the direction of movement of the light beam for reproduction as well, at the position Xs2 of the medium, the temperature of the medium rises to the temperature Ts in the vicinity of the Curie temperature of the second magnetic layer, and in the area closer to the light beam for reproduction than the position Xs2, the exchange-coupling between the first magnetic layer and the third magnetic layer is cut, and the force F1 which tries to move the magnetic walls toward the portion of higher temperature is acting on the magnetic walls 15. However, in the rear (the left side as viewed in FIG. 1A) of the light beam for reproduction, the temperature gradient is gentler than on the forward side (the right side as viewed in FIG. 1A) of the light beam for reproduction and therefore, the force F1 which tries to move the magnetic walls is small, and the force F1 is set to a value smaller than FS so that the magnetic walls may not move. Therefore, the magnetic walls do not move. When the magnetic walls 15 move under the light beam spot 16 for reproduction, the atom spin of the first magnetic layer in the spot is almost aligned in one direction. Each time the magnetic walls 15 come to the position Xs1 with the movement of the medium, the magnetic walls 15 move under the spot at a high speed and the direction of the atom spin in the spot is reversed and generally aligned in one direction. As a result, as shown in FIG. 1A, the amplitude of the reproduction signal always becomes substantially constant irrespective of the interval between the magnetic walls (i.e., a recorded mark length), and the medium is liberated from the problem of waveform interference or the like attributable to the optical diffraction limit.

The above-described condition that the magnetic walls move to Xe1 in the front side of the light beam for reproduction and the magnetic walls do not move in the rear side of the light beam for reproduction can be represented as the following expressions:

$$\left| 10^6 \times \frac{d\sigma w3}{dT} \right| < 2 \times Ms3 \times Hw3$$

and $$\left| 10^6 \times \frac{d\sigma w3}{dT} \right| > 2 \times Ms3 \times Hw3,$$

where σw1, Ms1 and Hw1 represent the magnetic wall energy density, saturation magnetization and magnetic wall coercivity, respectively, of the first magnetic layer at a temperature T represented by cgs unit system, and σw3, Ms3 and Hw3 represent the magnetic wall energy density, saturation magnetization and magnetic wall coercivity, respectively, of the third magnetic layer at the temperature T represented by cgs unit system. Also, when the temperature gradient k1 forward (forward in the direction of travel of the light beam for reproduction) in the temperature coercivity shown in FIG. 1B is $5 \times 10^5$ to $2 \times 10^6$ and the temperature gradient k2 rearward is $5 \times 10^4$ to $2 \times 10^5$, the construction of a reproducing system becomes easy, which is desirable.

An area 19 in which the direction of magnetization does not change is an area in which the direction of magnetization is determined at random when the application of the light beam for reproduction is started. It never happens that during reproduction the direction of magnetization in this area changes. Accordingly, DC offset occurs to the reproduction signal due to the reflected light from this area, but it does not affect the reproduction of the signal at all. Also, in the forward area of the light beam spot 16 for reproduction (the right side as viewed in FIG. 1A), there is an area in which the signal to be reproduced next is in the light beam spot for reproduction. But, as is well known, the intensity of the light beam spot assumes a Gaussian distribution and, therefore, the intensity is weak in the marginal portion, and the influence of the reflected light from this area on the reproduction signal is negligibly small.

Figure 2:
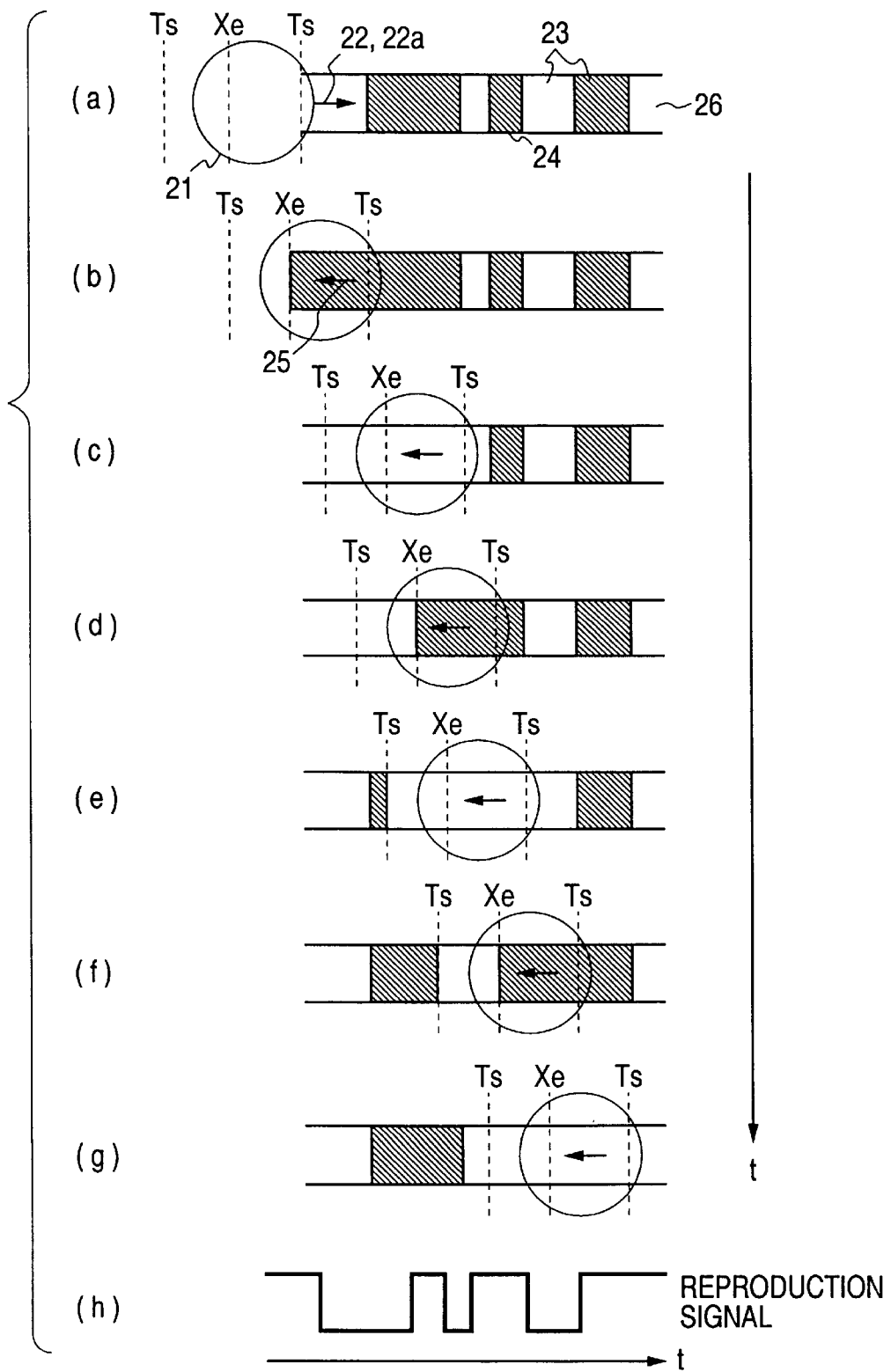
FIG. 2 is a schematic operation illustration of the magneto-optical recording-reproducing method of the present invention.

FIG. 2 illustrates the operation of the present invention when the light beam spot 21 for reproduction moves on an information track. (a)–(g) in FIG. 2 show the state in which the light beam spot 21 for reproduction moves on the information track in which magnetic domains 23 differing in recorded mark length are formed. (h) in FIG. 2 is a graph of the reproduction signal obtained.

In the present invention, as the light beam spot 21 for reproduction moves relative to the information track 26, the temperature profile also moves relative to the information track. The design is made such that the critical temperature Ts of the second magnetic layer is assumed in the vicinity of the front edge and the rear of the light beam spot 21 for reproduction. Accordingly, immediately after the light beam spot 21 for reproduction has come to a magnetic wall 24, the temperature of the magnetic wall 24 assumes the critical temperature Ts, and the magnetic wall 24 moves at a high speed in a direction 25 opposite to the direction of movement of the light beam spot for reproducing, and there is brought about a state in which the recorded mark has widened to a position Xe at which temperature is high and magnetic wall energy density is small ((b) in FIG. 2). Each time the light beam spot 21 for reproduction moves relative to the information track and that portion near the front edge of the light beam spot 21 for reproduction which assumes the critical temperature Ts comes to the magnetic wall, the movement of the magnetic wall takes place as shown in (c), (d), (e), (f) and (g) in FIG. 2, and there is obtained a reproduction signal of a great amplitude as shown in FIG. 2(h).

Also, rearwardly of the light beam spot for reproduction, there is a portion which assumes the critical temperature Ts of the second magnetic layer, and when the movement of the magnetic wall takes place here, the end point of the movement of the magnetic wall, i.e., the position Xe at which the temperature is high the magnetic wall energy density is small, is usually in the light beam spot for reproduction and therefore becomes the noise of the reproduction signal. In the present invention, however, the magnetic walls in the first magnetic layer are designed to be immovable in a temperature gradient area on the magneto-optical medium formed rearwardly in the direction of movement of the light beam spot for reproduction and, therefore, a good reproduction signal is obtained.

Figure 3:
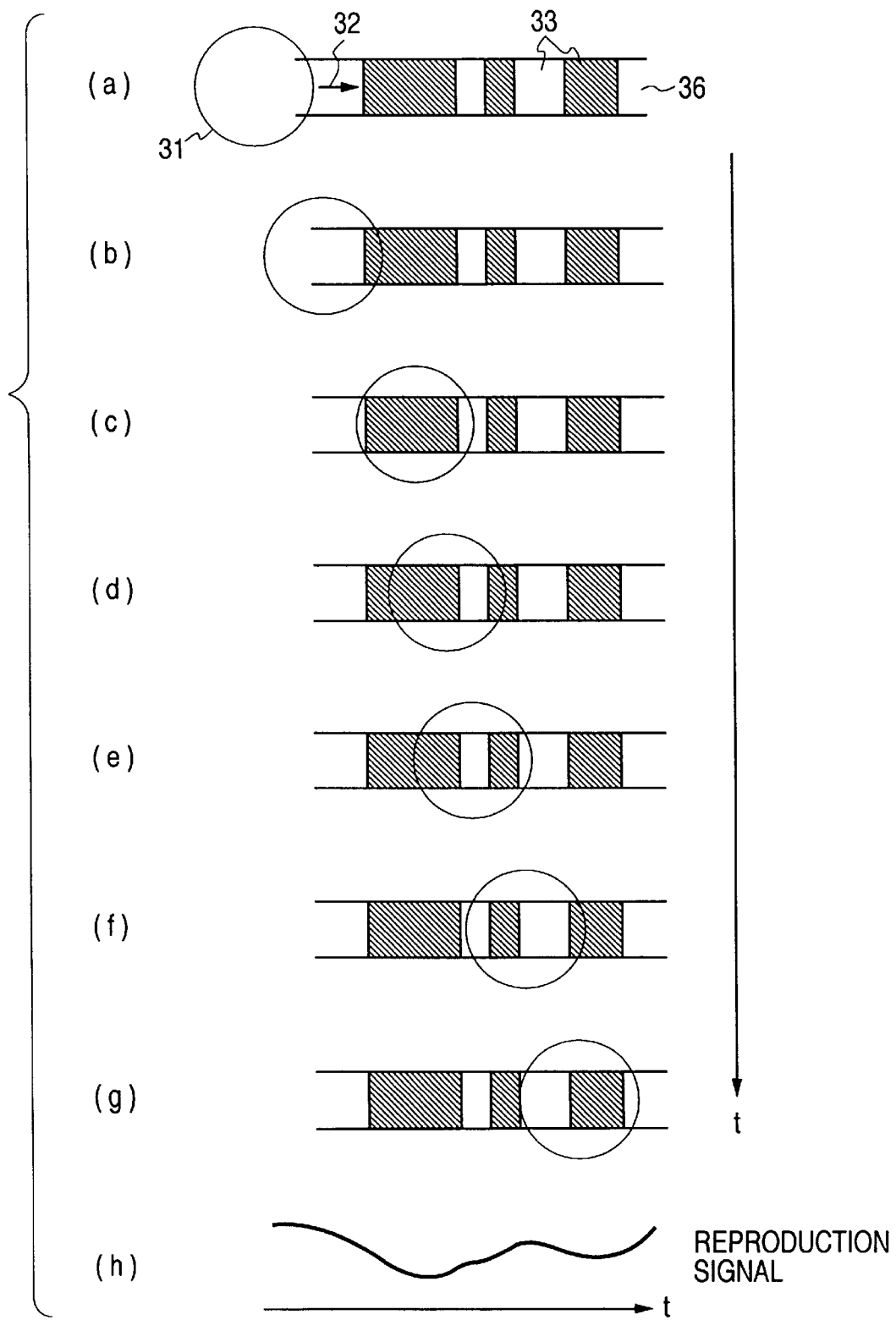
FIG. 3 is a schematic operation illustration of a magneto-optical recording-reproducing method according to the prior art.

FIG. 3 illustrates the operation of the conventional reproducing method when a light beam spot 31 for reproduction moves on an information track. (a)–(g) in FIG. 3 show a state in which the light beam spot 31 for reproduction moves on the information track 36 in which magnetic domains 33 differing in recorded mark length are formed. (h) in FIG. 3 is a graph of a reproduction signal obtained.

In the conventional reproducing method, when the magnetic domains 33 are sufficiently narrower than the spot diameter, a number of magnetic domains enter the light beam spot 31 for reproduction ((c)–(g) in FIG. 3), and the reproduction signal obtained becomes unclear ((h) in FIG. 3). When the minimum magnetic domain as shown in FIG. 3 becomes about ¼ of the light beam spot for reproduction, the reproduction of a signal is impossible by the conventional reproducing method.

In the conventional reproducing method, when the magnetic domains 33 are narrower than the spot diameter, the whole of the light beam spot 31 for reproduction is not housed in the magnetic domain ((b)–(g) in FIG. 3) and the reproduction signal obtained becomes unclear ((h) in FIG. 3). On the other hand, in the present invention, at a stage where the light beam spot 21 for reproduction has substantially come to the magnetic wall of a recorded mark, the magnetic wall sequentially moves rearwardly in the opposite direction ((b)–(g) in FIG. 2) and therefore, a very clear reproduction signal is obtained ((h) in FIG. 2).

Some embodiments of the present invention will hereinafter be described in detail with reference to the drawings.

Figure 4:
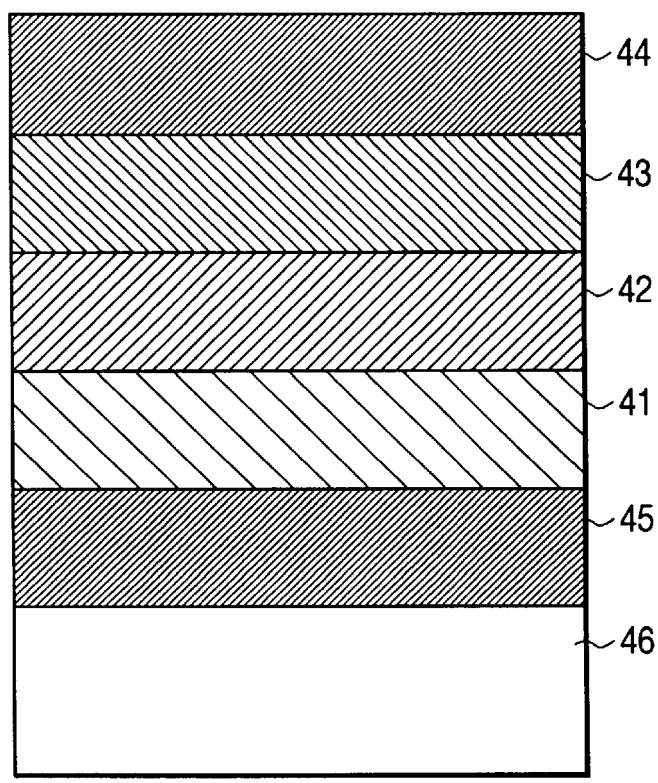
FIG. 4 is a schematic cross-sectional view showing an embodiment of the layer construction of the magneto-optical recording medium of the present invention.

FIG. 4 is a schematic cross-sectional view showing an embodiment of the layer construction of the magneto-optical recording medium of the present invention. In this embodiment, a dielectric material layer 45, a first magnetic layer 41, a second magnetic layer 42, a third magnetic layer 43 and a dielectric material layer 44 are laminated in succession on a transparent substrate 46.

As the transparent substrate 46, use can be made, for example, of polycarbonate, glass or the like. As the dielectric material layer 45, use can be made of a transparent dielectric material such as $Si_3N_4$, AlN, $SiO_2$, SiO, ZnS or $MgF_2$. Lastly, a similar material can be used for the dielectric material layer 44 as protective film formed again. These layers can be formed by continuous sputtering using, for example, a magnetron sputter apparatus, or continuous evaporation or the like. Particularly, the magnetic layers can be exchange-coupled with to one another by continuously forming film without breaking vacuum.

Also, a metallic layer formed of Al, AlTa, AlTi, AlCr, Cu, Au or the like may be further added to this construction to thereby adjust the thermal characteristic. Also, a protective coat formed of high molecular resin may be applied thereto, or a substrate after film formation may be cemented thereto.

In the above-described medium, it would come to mind to form the magnetic layers 41–43 of various magnetic materials. Magnetic layers 41–43 can be formed, for example, of a rare earth-iron group noncrystalline alloy composed of 10–40 at % of one or two or more kinds of rare earth metallic elements such as Pr, Nd, Sm, Gd, Tb, Dy and Ho and 90–60 at % of one or two or more kinds of iron group elements such as Fe, Co and Ni. Also, in order to improve corrosion resistance, a small quantity of element each as Cr, Mn, Cu, Ti, Al, Si, Pt or In may be added. By "iron group" here is meant the elements iron, cobalt, and nickel.

When each magnetic layer is formed of a heavy rare earth-iron group non-crystalline alloy, it is possible to control the saturation magnetization thereof by the composition ratio between the rare earth element and the iron group element. It is also possible to control the Curie temperature of each magnetic layer by the composition ratio, but to control it independently of saturation magnetization, a method of using a material in which part of Fe as the iron group element is replaced by Co to control the amount of replacement can be utilized more preferably. That is, by replacing 1 at % of Fe by Co, a rise of Curie temperature by the order of 6° C. can be expected; therefore, the amount of addition of Co is adjusted by the use of this relation so that the desired Curie temperature may be assumed. It is also possible to add a slight quantity of non-magnetic element such as Cr or Ti to thereby reduce the Curie temperature conversely. By using two or more kinds of rare earth elements to adjust their composition ratio, the Curie temperature can also be controlled. Besides these materials, a material such as garnet, platinum group-iron group periodic structure film or a platinum group-iron group alloy can be used. By "platinum group" here is meant the elements Ru, Rh, Pd, Os, Ir and Pt.

To satisfy the above-mentioned conditional expressions of the present invention, it is necessary to adjust the magnetic wall energy density σw, saturation magnetization Ms and magnetic wall coercivity Hw of the first magnetic layer and the third magnetic layer. For example, there are the following techniques as the technique for adjusting Hw.

1. A material in which desired Hw is obtained as a rare earth element in a rare earth-transition metal alloy is chosen, and Hw is finely adjusted by an additive such as Cr or Ti.

2. Sputter conditions (sputter gas pressure, sputter gas flow rate, sputter power, etc.) when film formation is effected by a sputtering apparatus are adjusted to thereby adjust Hw.

3. Hw is also changed by the surface property of a substrate or a dielectric material layer formed as groundwork; therefore, the surface property of the substrate or the dielectric material layer the formation of the magnetic layers is changed by reverse sputtering or the like to thereby adjust Hw.

Also, whether Hw has been adjusted to desired Hw can be confirmed by the following technique.

Hw is found by the measurement of the coercive force in depo state (the state immediately after deposition by evaporation). The point at which a change in magnetization begins when a magnetic field is gradually applied from depo state indicates the magnetic wall coercivity. Also, saturation magnetization can be adjusted by the adjustment of the composition, as described above.

Also, magnetic wall energy density, like Hw, can be adjusted by the selection of a material, the state of the groundwork, and the sputter state.

It is desirable that a rare earth-iron group non-crystalline alloy such as GdCo, GdFeCo, GdFe or NdGdFeCo which is small in vertical magnetic anisotropy, platinum group-iron group periodic structure film such as Pt/Co or Pd/Co, or a material for bubble memory such as garnet be used for the first magnetic layer.

It is desirable that a material such as TbFe, DyFe, TbDyFe, TbFeCo, DyFeCo or TbDyFeCo which is low in Curie temperature be used for the second magnetic layer.

It is desirable that a material such as a rare earth-iron group non-crystalline alloy such as TbFeCo, DyFeCo or TbDyFeCo, which is great in vertical magnetic anisotropy and coercive force and on which micro pits can be recorded and the formed recording pits can be held stably, be used for the third magnetic layer.

The recording of a data signal on the magneto-optical recording medium of the present invention is effected with the external magnetic field being modulated while the medium is moved, and a laser beam of such power that the third magnetic layer assumes Curie temperature or higher is applied, or is effected with the laser power modulated while a magnetic field in a predetermined direction is applied. In the latter case, if the intensity of the laser beam is adjusted so that only a predetermined area in the light spot may assume the vicinity of the Curie temperature of the third magnetic layer, a recording magnetic domain having a diameter equal to or less than that of the light spot can be formed with the result that a signal of a period equal to or less than the diffraction limit of the light can be recorded.

While the present invention will hereinafter be described with respect to some embodiments thereof, the present invention is not restricted to these embodiments.

Embodiment 1

Description will first be made of a magneto-optical recording medium having first to third magnetic layers as shown in FIG. 4.

The targets of B-doped Si, and Gd, Dy, Tb, Fe and Co were mounted on a DC magnetron sputtering apparatus, and a polycarbonate substrate formed with a guide groove for tracking was fixed to a substrate holder, whereafter the interior of a chamber was evacuated by a cryopump until high vacuum of $1 \times 10^{-5}$ Pa or less was reached. Ar gas was introduced into the chamber until 0.3 Pa was reached while the chamber remained evacuated, and an SiN layer of a thickness 800 Å which was an interference layer was formed while the substrate was rotated. Subsequently, a GdCo layer ($Gd_{0.22}Co_{0.78}$) of a thickness 300 Å was formed as the first magnetic layer, a DyFe layer ($Dy_{0.22}Fe_{0.78}$) of a thickness 100 Å was formed as the second magnetic layer, and a TbFeCo layer ($Tb_{0.23}(Fe_{0.85}Co_{0.15})_{0.77}$) of a thickness 400 Å was formed as the third magnetic layer. Lastly, an SiN layer of a thickness 800 Å was formed as a protective layer. During the formation of the SiN layers, $N_2$ gas was introduced in addition to Ar gas, and these layers were formed by DC reactive sputter. Each magnetic layer was formed by DC power being applied to the targets of Gd, Dy, Tb, Fe and Co. The composition of each magnetic layer was adjusted so as to be in the vicinity of the compensation composition, and Curie temperature was set so as to be 300° C. or higher for the first magnetic layer, 70° C. for the second magnetic layer, and about 200° C. for the third magnetic layer.

Figure 5:
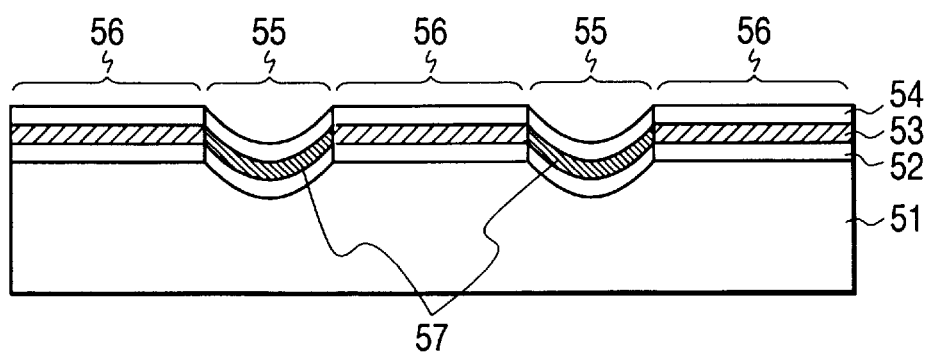
FIG. 5 is a schematic cross-sectional view showing an embodiment of the magneto-optical recording medium of the present invention.
Figure 6:
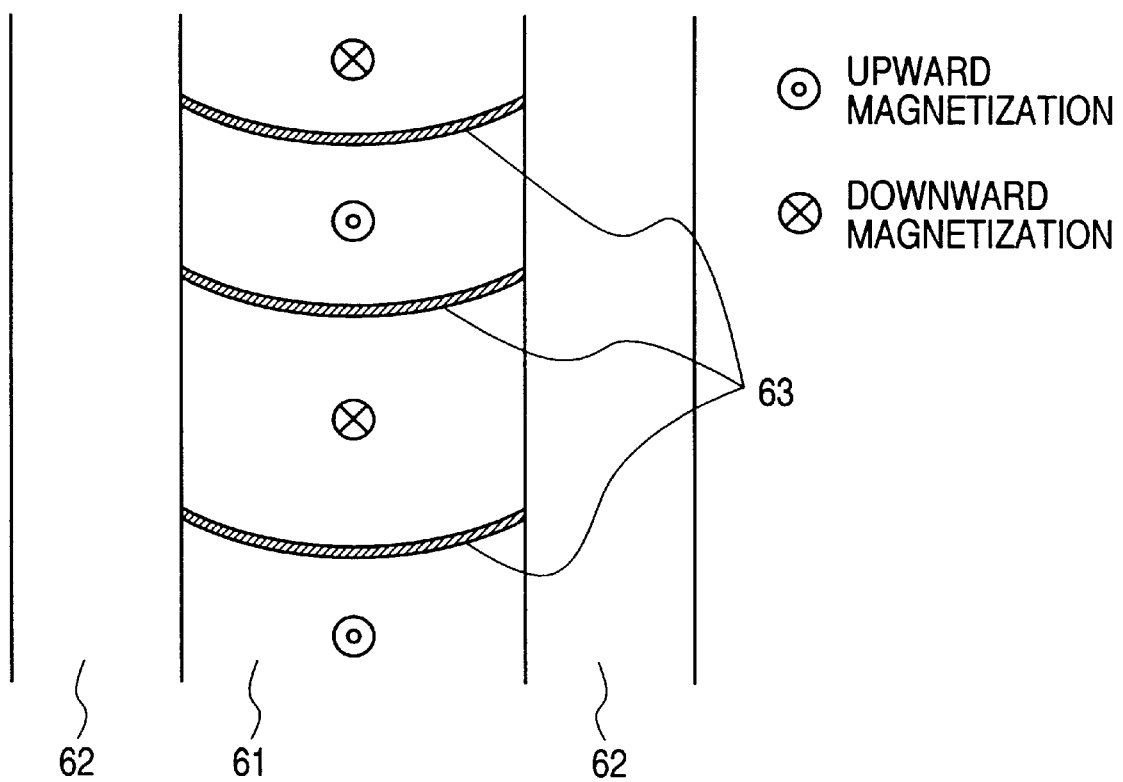
FIG. 6 is a schematic view showing the magnetized state of the magneto-optical recording medium of the present invention.

A laser beam of high power was condensed and applied onto the grooves of this medium to thereby heat the medium to 500° C. or higher, and an annealing process was carried out on the groove portion only. This medium, as shown in its cross-sectional view (FIG. 5), is such that a dielectric material layer 52, a magnetic layer 53 and a dielectric material layer 54 are laminated in succession on a transparent substrate 51. The magnetic layer laminated on the grooves 55 has been changed to a non-magnetic layer 57 by the aforementioned annealing process. By this non-magnetic layer 57, the magnetic layer 53 laminated on a land 56 is substantially magnetically separated in the portion of the groove 55. Actually, even if the magnetic layer on the grooves does not become a completely non-magnetic layer by the annealing process, if the saturation magnetization thereof becomes sufficiently small, the coupling by the grooves can be ignored. In the present invention, it also covers such a state that the magnetic layers are magnetically separated from each other between information tracks. When a reverse magnetic domain is formed on the land 56 over the full width thereof, magnetic walls 63 not closed are formed in the boundary portion of the magnetic domain on a land 61 (FIG. 6). Such magnetic walls are not accompanied by appearance or disappearance of the magnetic walls on the side portions of the tracks even if they are moved in the direction of the tracks, and can therefore be moved easily.

Figure 7:
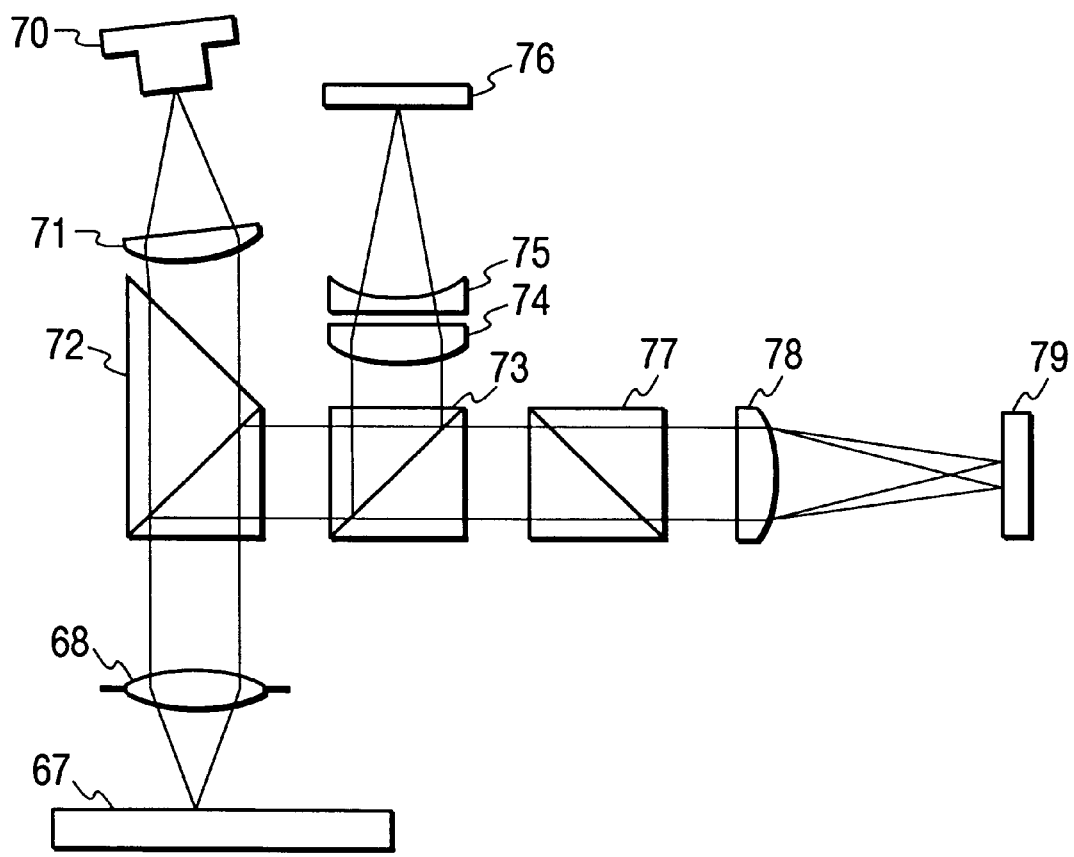
FIG. 7 is a view schematically showing the construction of a recording-reproducing apparatus used in the present invention.

The recording-reproducing characteristic of the magneto-optical recording medium thus obtained was measured. The recording-reproducing apparatus used in the measurement is an ordinary magneto-optical disc recording-reproducing apparatus as shown in FIG. 7. Reference numeral 70 designates a laser source for recording and reproduction, of which the wavelength is 680 nm and N.A is 0.55, and which is disposed so that P-polarization may be incident on the recording medium. Reference numeral 72 denotes a beam splitter with a beam shaping portion, which is designed to transmit 70–80% of P-polarization therethrough and to reflect 100% of S-polarization. Reference numeral 68 designates an objective lens which is track-controlled and focus-controlled so as to condense the laser beam for recording and reproduction on the information tracks of a magneto-optical disc 67. Reference numeral 73 denotes a beam splitter for distributing reflected light, which is a beam splitter for distributing the reflected light from the magneto-optical disc 67 to an RF sensor 79 for detecting an information signal and a servo-sensor 76 for detecting a track error signal and a focus error signal. Reference numeral 77 designates double refractive crystal for separating polarized components of ±45° relative to the incident light to differentially detect the reflected light from the magneto-optical disc 67.

Figure 8A:
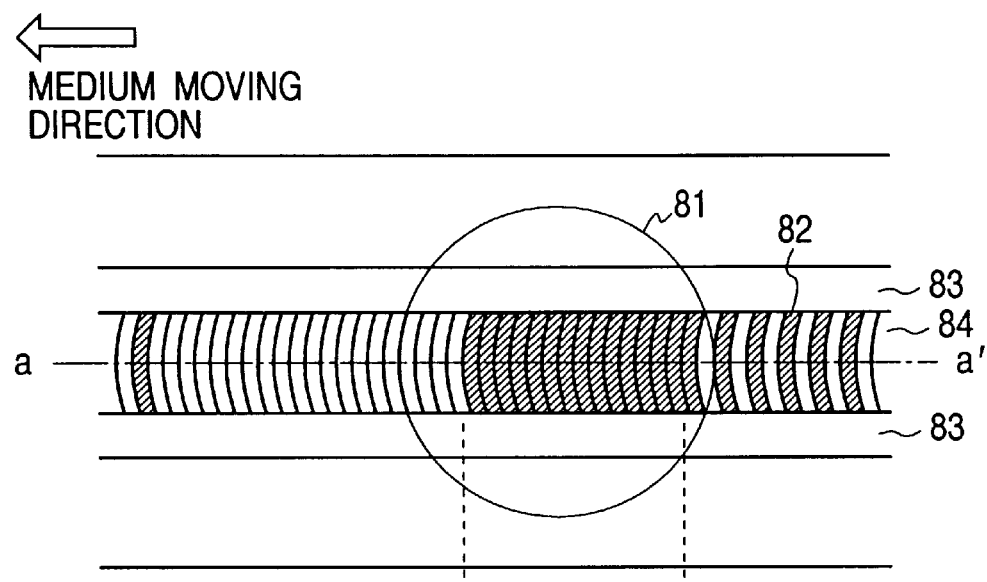
FIGS. 8A and 8B are illustrations of the reproducing state in the magneto-optical reproducing method of the present invention.
Figure 8B:
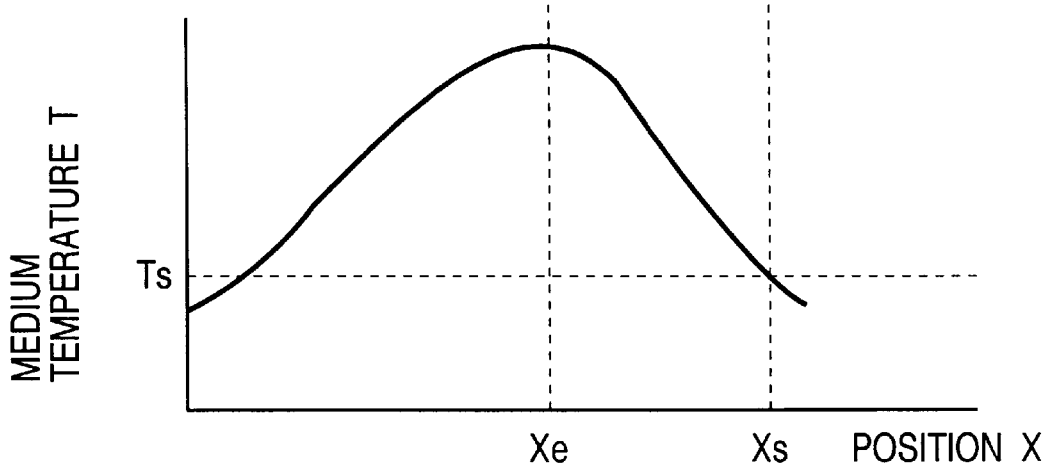

By this optical system, as shown in FIG. 8A, a light beam spot 81 for reproduction can be imaged on the land 84 between grooves 83 on the recording surface of the recording medium. A temperature gradient created on a dotted line a—a' in FIG. 8A by a light beam spot 81 at this time is shown in FIG. 8B.

First, the recording medium was rotated so that the relative speed thereof to the light beam for recording and reproduction might be 2 m/S, and then the magnetic field was modulated by ±150 Oe while a laser for recording and reproduction was DC-applied at 6 mW, whereby the third magnetic layer was heated to above the Curie temperature thereof, whereafter in a cooling process, a repeated pattern of upward magnification and downward magnification corresponding to the modulation of the magnetic field was formed.

The modulation frequency of the recording magnetic field was changed to 1–10 MHz, and a pattern of a mark length within a range of 1.0–0.1 μm was recorded.

Figure 10:
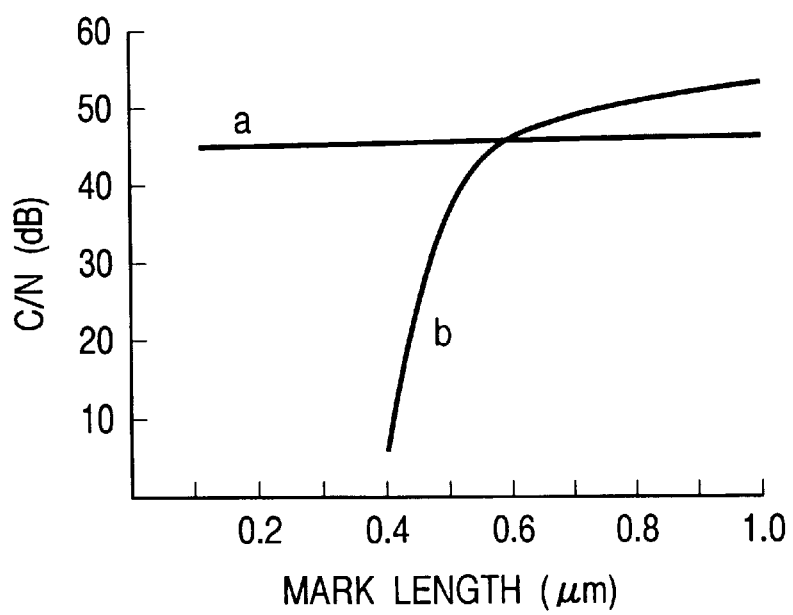
FIG. 10 is a graph showing changes in C/N for a mark length in the embodiment and the comparative example of the magneto-optical reproducing method.

The power of the laser beam for recording and reproduction during reproduction was 2 mW and C/N was measured with respect to a pattern of each mark length. The temperature profile on the surface of the medium at this time is as shown in FIG. 8B. The result of this measurement is shown by the graph line a of FIG. 10.

Figure 9:
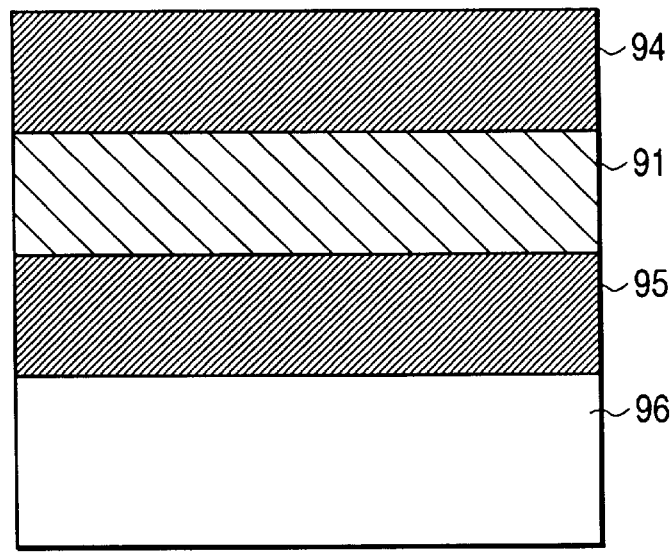
FIG. 9 is a schematic cross-sectional view showing the layer construction of a magneto-optical recording medium according to a comparative example.

Also, as a comparative example, a recording medium for comparison similar to the above-described recording medium with the exception that the third magnetic layer and the second magnetic layer were not formed, as shown in FIG. 9, was made, and as described above, a pattern of a mark length within a range of 1.0–0.1 μm was recorded, and C/N was measured at the laser power of 2 mW. The result of this measurement is shown as the graph line b of FIG. 10.

In this comparative example, the reproduction is ordinary reproduction and therefore, when the mark length became short, reproduction C/N was suddenly reduced. In contrast, in Embodiment 1, C/N hardly changed up to a mark length 0.1 μm.

According to the reproducing method of the present invention, a recorded mark is enlarged in the reproduction spot and detected and therefore, not only a signal of a period less than the diffraction limit of light becomes reproducible, but the mark length dependency of C/N becomes almost null.

Embodiment 2

Thin film was formed on a polycarbonate substrate by a film forming apparatus and a film forming method similar to those in Embodiment 1, whereby a magneto-optical recording medium was made. This magneto-optical recording medium was rotated so that the relative speed thereof to the light beam for recording and reproduction might be 4 m/S, and a magnetic field as shown in FIG. 11B was applied to the magneto-optical recording medium while a laser for recording and reproduction was DC-applied thereto at 7 mW, whereby the signal of FIG. 11A was recorded. This signal, on the medium, becomes a mark comprising marks of a length 0.2 μm arranged at intervals of 2 μm. The intensity of the magnetic field was ±150 Oe.

This recorded mark was reproduced by lasers of powers of 1.5 mW, 2.2 mW and 3.0 mW and reproduction signals were observed by means of an oscilloscope. The wavelength of the reproducing light is 780 nm, and N.A. is 0.55. The reproduction waveforms at this time are shown in FIGS. 11C, 11D and 11E. When the reproduction power was 1.5 mW, a signal of a small amplitude as shown in FIG. 11C was only observed. This is because the mark length is 0.2 μm, much smaller than the spot of the reproducing light. When the reproduction power was 2.2 mW, the reproducing method became that of the present invention, and there was obtained a reproduction signal of a waveform of a great amplitude approximate to a rectangular wave as shown in FIG. 11D. When the reproduction power was 3.0 mW, the magnetic wall of the first magnetic layer moved in the temperature gradient area on the magneto-optical medium formed rearwardly in the direction of movement of the light beam spot therefore, the delay signal of the original reproduction signal was observed as noise under the influence of the magnetic wall moving from rearwardly in the direction of movement of the light beam spot.

Thus, it could be confirmed that the magnetic wall in the first magnetic layer could be made movable by the temperature gradient on the magneto-optical medium formed forwardly in the direction of movement of the light beam spot by the adjustment of the reproduction power, and that in the temperature gradient area on the magneto-optical medium formed rearwardly in the direction of movement of the light beam spot, the magnetic wall in the first magnetic layer could be made immovable.

Embodiment 3

A magneto-optical recording medium was made in the same manner as in Embodiment 2, and a mark comprising marks of a length 0.2 μm arranged at intervals of 2 μm was recorded on this magneto-optical recording medium. This recorded mark was reproduced with reproduction powers of 1.5 mW, 2.2 mW and 3.0 mW, and the reproduction signals thereof were observed by means of an oscilloscope.

Figure 12:
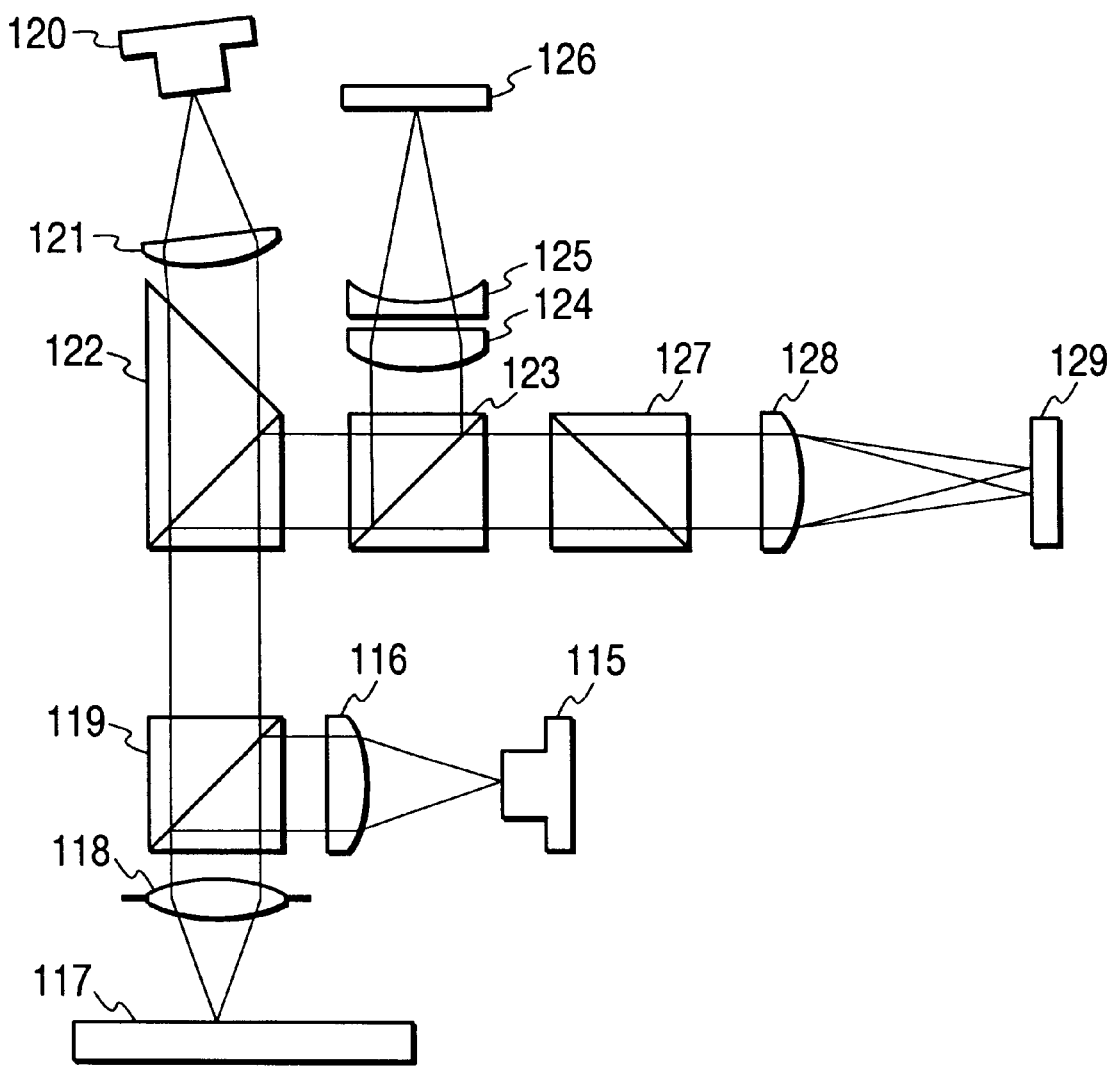
FIG. 12 is a view schematically showing the construction of a recording-reproducing apparatus used in the present invention.

In the present embodiment, however, as the recording-reproducing apparatus, use was made of an apparatus provided with a light source for auxiliary heating using a light emitting diode as shown in FIG. 12. As the light emitting diode 115 of FIG. 12, use was made of one having the central wavelength of 950 nm. Light emitted from the light emitting diode 115 is adjusted so as to form a light spot having a diameter of about 5 μm at 2 μm rearwardly in the direction of movement of a light spot for reproduction formed by a laser source 120. The light emitting diode was used as auxiliary heating means for emitting light at light power of about 20 mW and making the temperature gradient rearward in the direction of movement of the light spot for reproduction small.

The mark previously recorded by the recording-reproducing apparatus shown in FIG. 12 was reproduced with reproduction powers of 1.5 mW, 2.2 mW and 3.0 mW, and the reproduction signals thereof were observed by means of the oscilloscope. The wavelength of the reproducing light is 780 nm, and N.A. is 0.55. When the reproduction power was 1.5 mW, a signal of a small amplitude similar to that shown in FIG. 11C was only observed, but when the reproduction power was 2.2 mW and 3.0 mW, reproduction signals of waveforms of great amplitudes approximate to a rectangular wave obtained.

Thus, it could be confirmed that, by providing the auxiliary heating means, the reproducing method of the present invention could be realized within a wide range of reproduction power. Also, in the present embodiment, a light emitting diode is used as the auxiliary heating means, but the auxiliary heating means may be other means, and of course, a semiconductor laser can be used instead of the light emitting diode.

The present invention is not limited to the above-described embodiments. As another possible embodiment, a method of adjusting the temperature profile on the medium by another means with the optical head kept conventional may be adopted. For example, the core of a floating head used for magnetic field modulation recording may be used as a heat source, or other suitable heat generating member may be disposed near the area of the medium to which the laser for reproduction is applied. In this case, however, care must be taken so that the positional relationship between the position of temperature, which is the movement starting position of the magnetic wall, and the light beam spot for reproduction are not fluctuated by a frequency approximate to the frequency of the reproduction signal.

What is claimed is:

1. A magneto-optical recording medium including:
   a first magnetic layer of which the magnetic wall moves and which contributes to reproduction;

a third magnetic layer in which information is accumulated; and a second magnetic layer disposed between said first magnetic layer and said third magnetic layer and having a lower Curie temperature than those of said first magnetic layer and said third magnetic layer;

wherein the following is satisfied at the lowest temperature Ts whereat the exchange-coupling between said first magnetic layer and said third magnetic layer is cut:

$$|k1*d\sigma w1/dT|>2*Ms1*Hw1>|k2*d\sigma w1/dT|$$

$$|k1*d\sigma w3/dT|[>]\leq 2*Ms3*Hw3$$

T . . . temperature represented by cgs unit system

σw1 . . . magnetic wall energy density of the first magnetic layer represented by cgs unit system Ms1 . . . saturation magnetization of the first magnetic layer represented by cgs unit system Hw1 . . . magnetic wall coercivity of the first magnetic layer represented by cgs unit system σw3 . . . magnetic wall energy density of the third magnetic layer represented by cgs unit system Ms3 . . . saturation magnetization of the third magnetic layer represented by cgs unit system Hw3 . . . magnetic wall coercivity of the third magnetic layer represented by cgs unit system k1 . . . one temperature gradient of a temperature profile formed on the medium k2 . . . the other temperature gradient of the temperature profile formed on the medium.

2. A magneto-optical recording medium according to claim 1, wherein $$5\times 10^5 \leq k1 \leq 2\times 10^6, 5\times 10^4 \leq k2 \leq 2\times 10^5.$$

3. A signal reproducing method of effecting the reproduction of information while applying a light beam spot to a magneto-optical recording medium provided with:

a first magnetic layer of which the magnetic wall moves and which contributes to reproduction;

a third magnetic layer in which information is accumulated; and a second magnetic layer disposed between said first magnetic layer and said third magnetic layer and having a lower Curie temperature than those of said first magnetic layer and said third magnetic layer, wherein the following conditional expressions are satisfied at the lowest temperature Ts whereat the exchange-coupling between said first magnetic layer and said third magnetic layer is cut:

$$k1*d\sigma w1/dT|>2*Ms1*Hw1>|k2*d\sigma w1/dT|$$

$$k1*d\sigma w3/dT|[>]\leq 2*Ms3*Hw3$$

T . . . temperature represented by cgs unit system

σw1 . . . magnetic wall energy density of the first magnetic layer represented by cgs unit system Ms1 . . . saturation magnetization of the first magnetic layer represented by cgs unit system Hw1 . . . magnetic wall coercivity of the first magnetic layer represented by cgs unit system σw3 . . . magnetic wall energy density of the third magnetic layer represented by cgs unit system Ms3 . . . saturation magnetization of the third magnetic layer represented by cgs unit system Hw3 . . . magnetic wall coercivity of the third magnetic layer represented by cgs unit system k1 . . . temperature gradient in a temperature profile formed on the medium, on the forward side in the direction of movement of a light beam spot k2 . . . temperature gradient in the temperature profile formed on the medium, on the rearward side in the direction of movement of the light beam spot, said method being provided with the steps of:

moving said light beam spot and the medium relative to each other;

forming on said medium a temperature profile causing a portion of said second magnetic layer to rise in temperature to above Curie temperature, by said light beam spot;

making the magnetic wall in said first magnetic layer movable in the area of said temperature gradient k1, and making the magnetic wall in said first magnetic layer immovable in the area of said temperature gradient k2; and reproducing said information by detecting the movement of said magnetic wall.

4. A signal reproducing method according to claim 3, wherein said forming step includes the step of:

adjusting the intensity of said light beam spot to form a temperature profile having the temperature gradients k1 and k2 which satisfy said conditional expressions.

5. A signal reproducing method according to claim 3, wherein said forming step includes the step of:

heating the region on the medium to which said light beam spot is applied, by means discrete from said light beam spot, to form a temperature profile having the temperature gradients k1 and k2 which satisfy said conditional expressions.

* * * * *

UNITED STATES PATENT AND TRADEMARK OFFICE
CERTIFICATE OF CORRECTION

PATENT NO. : 5,936,915

DATED : August 10, 1999

INVENTOR(S) : EIICHI FUJII, ET AL.

It is certified that error appears in the above-identified patent and that said Letters Patent is hereby corrected as shown below:

ON THE TITLE PAGE AT [57]
  Abstract, "σrw3," should read --σw3,--.

COLUMN 2
  Line 12, "and" should be deleted; and "becomes" should read --become--;
  Line 41, "|k1*dσw3/dT|<2*Ms3*Hw3" should read
    --|k1*dσw1/dT/>2*Ms1*Hw1>|k2*dσw1/dT|
        |k1*dσw3/dT|<2*Ms3*Hw3--;
  Line 43, "σw1" should read --σw1--;
  Line 49, "σw3" should read --σw3--.

COLUMN 3
  Line 9, "|k1*dσw3/dT|<2*Ms3*Hw3" should read
    --|k1*dσw1/dT|>2*Ms1*Hw1>|k2*dσw1/dT|
        |k1*dσw3/dT| <2*Ms3*Hw3--;
  Line 50, "showing" should read --shows--;
  Line 51, "medium," should read --medium;--.

COLUMN 5
  Line 59, "and therefore," should read --and, therefore,--.

COLUMN 6
  Line 16

$$"|10^6 \times \frac{d\sigma w3}{dT}| < 2 \times Ms3 \times Hw3$$

and $$|10^6 \times \frac{d\sigma w3}{dT}| > 2 \times Ms3 \times Hw3,"$$

should read

UNITED STATES PATENT AND TRADEMARK OFFICE
CERTIFICATE OF CORRECTION

PATENT NO. : 5,936,915:
DATED : August 10, 1999
INVENTOR(S) : EIICHI FUJII, ET AL.

It is certified that error appears in the above-identified patent and that said Letters Patent is hereby corrected as shown below:

--At a temperature of at least Ts, $$\left|10^6 \text{x} \frac{d\sigma w1}{dT}\right| > 2\text{xMs1xHw1} > \left|10^5 \text{x} \frac{d\sigma w1}{dT}\right|$$

and $$\left|\frac{10^6 \text{xd}\sigma w3}{dT}\right| < 2\text{xMs3xHw3}, --.$$

COLUMN 8
Line 6, "to" should be deleted.

COLUMN 9
Line 1, "in" should read --in a--;
Line 4, "from" should read --from a --.

COLUMN 11
Line 64, "spot" should read --spot;--.

NY_MAIN 36644 v 1

Signed and Sealed this

Eighteenth Day of April, 2000

Attest:

Q. TODD DICKINSON

Attesting Officer    Director of Patents and Trademarks